United States Patent
Salinas et al.

(10) Patent No.: US 6,992,886 B2
(45) Date of Patent: *Jan. 31, 2006

(54) SYSTEM FOR LATCHING AND EJECTING A MODULAR COMPONENT FROM AN ELECTRONIC DEVICE

(75) Inventors: Everett R. Salinas, Pasadena, TX (US); George D. Megason, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/706,204

(22) Filed: Nov. 12, 2003

(65) Prior Publication Data

US 2004/0095718 A1    May 20, 2004

Related U.S. Application Data

(63) Continuation of application No. 10/022,744, filed on Dec. 13, 2001, now Pat. No. 6,667,879.

(51) Int. Cl.
*G06F 1/16* (2006.01)

(52) U.S. Cl. ..................... 361/685; 361/686

(58) Field of Classification Search ......... 361/685–686
See application file for complete search history.

(56) References Cited

U.S. PATENT DOCUMENTS

| | | | | |
|---|---|---|---|---|
| 5,299,089 A | * | 3/1994 | Lwee | 361/384 |
| 5,305,180 A | * | 4/1994 | Mitchell et al. | 361/685 |
| 5,319,519 A | * | 6/1994 | Sheppard et al. | 361/685 |
| 5,793,607 A | * | 8/1998 | Karidis et al. | 361/684 |
| 5,828,546 A | * | 10/1998 | Tirrell et al. | 361/685 |
| 6,069,790 A | * | 5/2000 | Howell et al. | 361/686 |
| 6,155,863 A | * | 12/2000 | Matsuzaki et al. | 439/353 |
| 6,469,900 B2 | * | 10/2002 | Cheng | 361/726 |
| 2003/0011978 A1 | | 1/2003 | Moore | |

* cited by examiner

*Primary Examiner*—Yean-Hsi Chang

(57) ABSTRACT

A latch and ejector system utilized in an electronic device. The latch and ejector system allows for the tool-less release and removal of various components, such as drives, from various electronic devices. The latch system secures the component within the electronic device during use but provides for the ready release and movement of the component to an ejected position. Once the component is at the ejected position, a user may readily remove the component.

34 Claims, 6 Drawing Sheets

SYSTEM FOR LATCHING AND EJECTING A MODULAR COMPONENT FROM AN ELECTRONIC DEVICE

This application is a Continuation application of application Ser. No. 10/022,744, which was filed on Dec. 13, 2001.

FIELD OF THE INVENTION

The present invention relates generally to modular devices, such as drives, that are mounted in a variety of electronic devices, e.g. computers and servers. The invention is particularly related to a latch and ejector system for facilitating selective retention and ejection of the component from the chassis of the electronic device.

BACKGROUND OF THE INVENTION

A variety of electronic devices, such as computers and servers, comprise various components that may be replaced or interchanged with other components. For example, a computer or server typically has one or more drives. Such drives usually are mounted in a chassis via screws. To service, replace or switch drives, the computer is placed out of service while a technician removes screws and manually disconnects cables to exchange or service the drive, e.g. CD drive or floppy drive.

It would be advantageous to have a technique that facilitates the exchange of drives or a variety of other components used in electronic devices.

SUMMARY OF THE INVENTION

The present invention relates generally to a technique for tool-less exchange of components in an electronic device. An exemplary component is a drive that might be found in a computer or server. The technique utilizes a latch system that secures the component in a chassis. However, upon activation of the latch system, the component is both released and forced outwardly to an ejected position. When the component is moved to this ejected position, a user is readily able to grasp the component for servicing or for exchange with another component.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
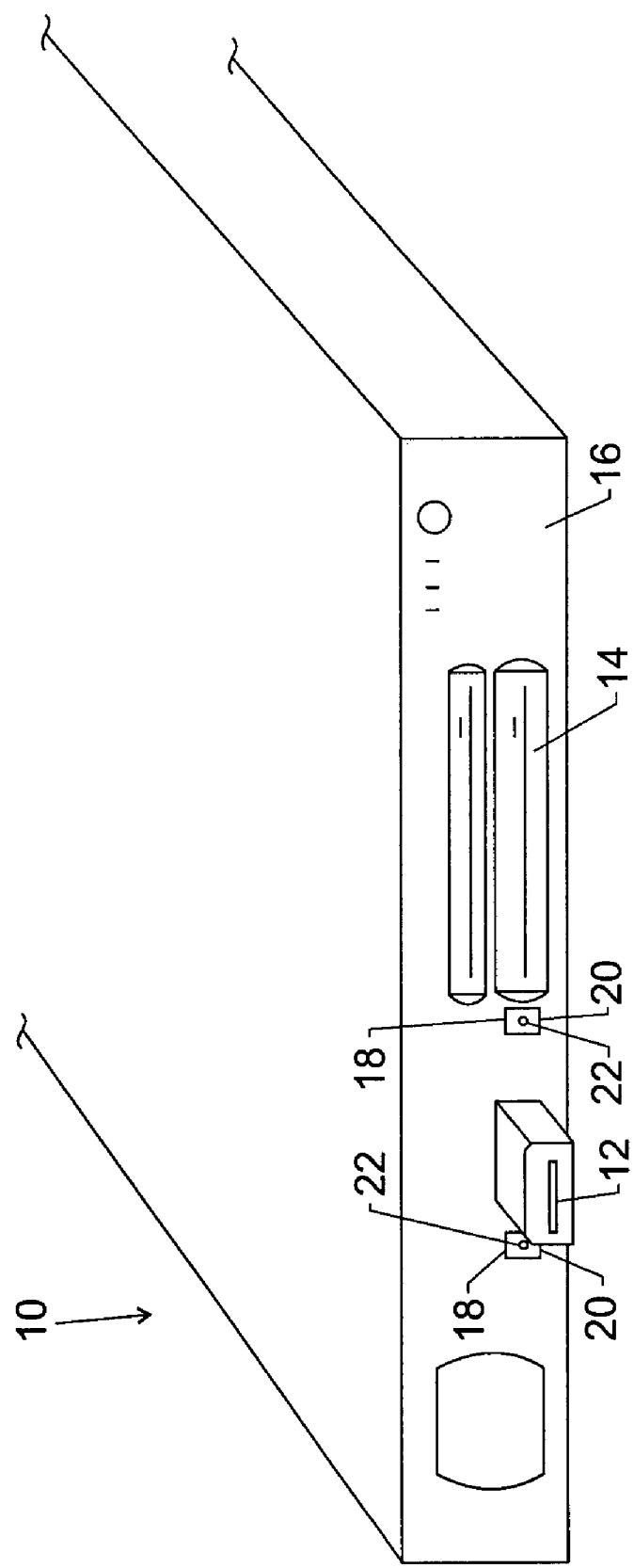
FIG. 1 is a perspective view an exemplary electronic device incorporating aspects of the present invention.

Referring generally to FIG. 1, an exemplary electronic device 10 is illustrated according to one embodiment of the present invention. Electronic device 10 may comprise, for example, a computer or a server having one or more removable components 12 and 14. A typical example of a removable component 12 or 14 is a drive, such as a CD drive, floppy drive, hard drive or DVD drive. The removable components or drives 12, 14 are accessible through a panel 16, such as a front panel of electronic device 10.

Device 10 also comprises at least one latch system 18 associated with at least one of the drives 12 or 14. In the embodiment illustrated, both drives 12 and 14 have a corresponding latch system 18. By actuating latch system 18, the corresponding drive or other removable component is released and moved to an ejected position. For example, in FIG. 1, drive 14 is illustrated in a latched or operating position, and drive 12 is illustrated in an ejected position that permits a user to easily grasp the drive and remove it from device 10. The latch system 18 is designed to electrically and mechanically disconnect the associated drive as it is forced outwardly to the ejected position. This facilitates easy exchange or servicing of a desired drive.

In the embodiment illustrated, the exemplary latch system 18 is actuated by pressing an actuator 19. One example of actuator 19 is a pair of push buttons 20 and 22. Push button 22 extends through the front of push button 20 such that a user initially presses push button 22 inwardly until contacting push button 20 which is then moved inwardly an additional distance. Depression of push button 22 mechanically releases the associated drive, and continued depression of push button 20 physically moves the drive to the ejected position.

Figure 2:
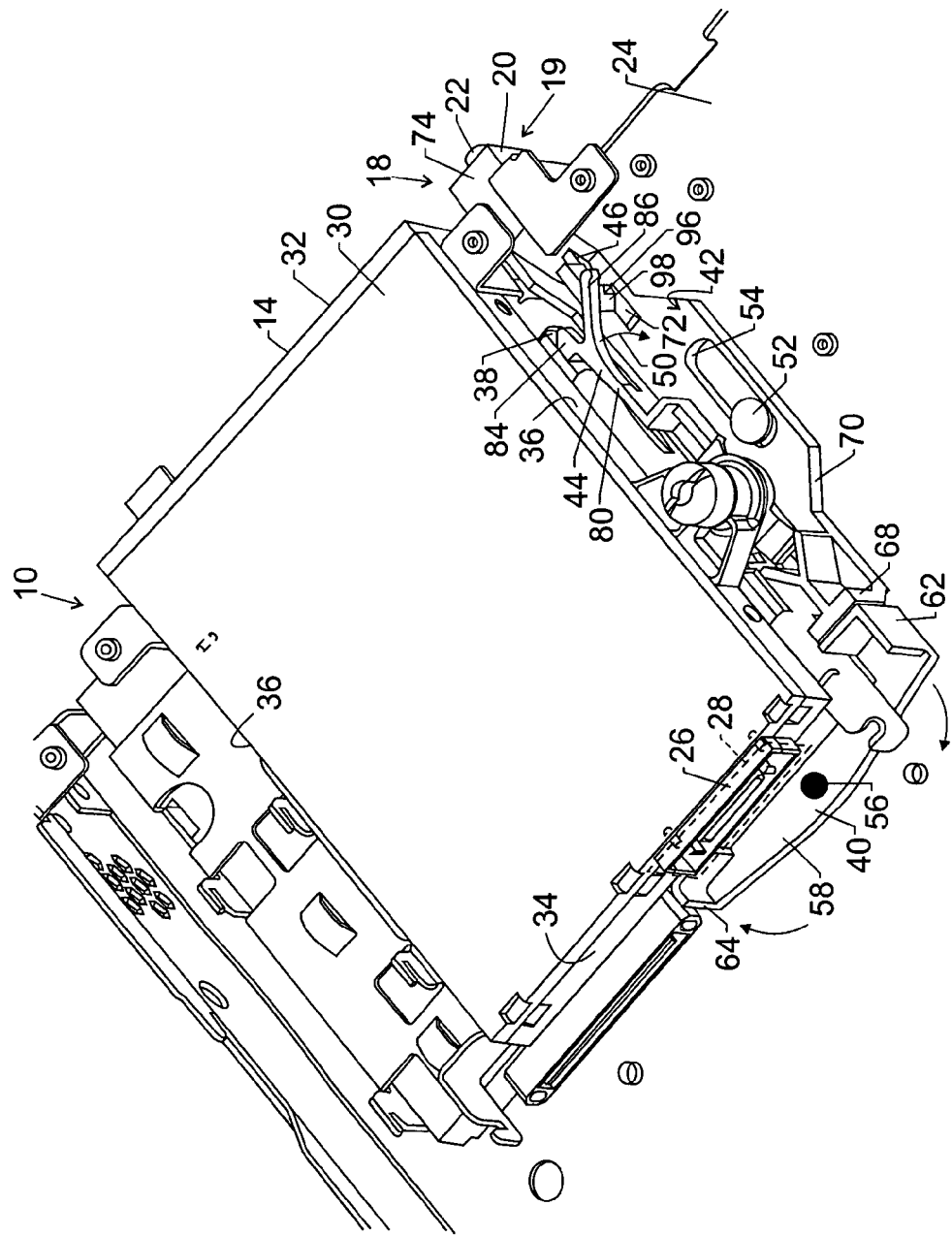
FIG. 2 is a perspective view of an exemplary drive and latch system mounted within a chassis.
Figure 3:
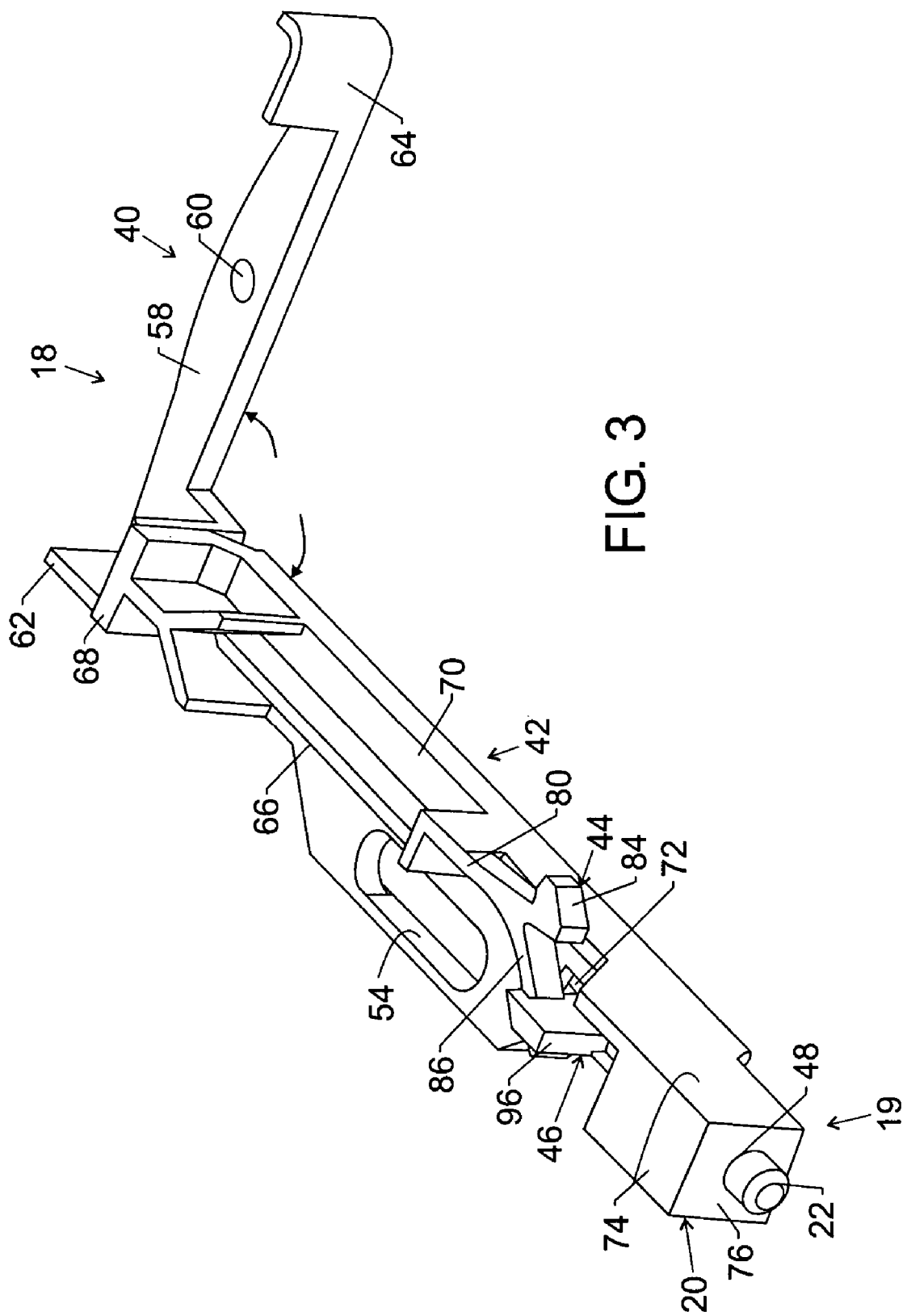
FIG. 3 is a perspective view of the exemplary latch system illustrated in FIG. 2.

Referring generally to FIGS. 2 and 3, one specific embodiment of latch system 18 is illustrated. As illustrated best in FIG. 2, latch system 18 is mounted to a chassis 24 of a desired electronic device, such as the computer or server discussed above. Mounted in chassis 24 is a movable component, e.g. movable component 14. In this particular embodiment, component 14 comprises a drive that is electrically coupled into electronic device 10 via a connector 26 that plugs into a corresponding connector 28 (shown in dashed lines) of device 10 when installed.

Movable component 14 comprises an outer housing 30 having a front 32, a back 34 and a pair of sides 36. Latch system 18 is positioned along one of the sides 36. This side 36 comprises a recessed or cutout portion 38 that interacts with latch system 18 to securely latch or hold component 14 when installed in electronic device 10.

Latch system 18 generally comprises a throw or lever 40, a base portion 42, a latch 44 and a release plunger 46 (see also FIG. 3). When component 14 is installed, latch 44 engages recessed portion 38 to securely hold the component within chassis 24. When latch system 18 is actuated, however, latch 44 is moved away from recessed portion 38 to release component 14. Subsequently, lever 40 is actuated against back 34 of component 14 to force the component outwardly to its ejected position. The lever acts against back 34 with sufficient force to disconnect connector 26 and to slide component 14 outwardly for servicing, replacement or exchange with another type of drive or other component.

It should be noted that a variety of levers, buttons, and other actuators can be used to release component 14 and to move the component to an ejected position. As illustrated, though, release plunger 46 comprises push button 22 that extends through an opening 48 formed through the front of push button 22. Push button 22 forms a part of base portion 42. To release and move component 14 to its ejected position, an individual presses push button 22 to move release plunger 46 against latch 44. This movement causes latch 44 to disengage from recessed portion 38, as indicated by arrow 50 of FIG. 1. As the user continues to depress push button 22, push button 20 is eventually engaged causing movement of base portion 42.

For example, base portion 42 may be slidably mounted to chassis 24 via one or more pins 52 extending from chassis 24 and engaged within a slot 54 formed in base portion 42. As base portion 42 is slid along pin 52, it acts against lever 40 and pivots lever 40 about a pivot 56. Pivot 56 may be formed by an appropriate boss or screw extending through lever 40 into engagement with chassis 24.

Lever 40 is positioned such that it is pivoted into back 34 of component 14 to force a disconnection of connector 26 and to move component 14 to its ejected position. Thus, a user is able to actuate latch system 18 with a single linear motion, e.g. by applying pressure with a thumb or forefinger, to both release and eject a given component.

Figure 4:
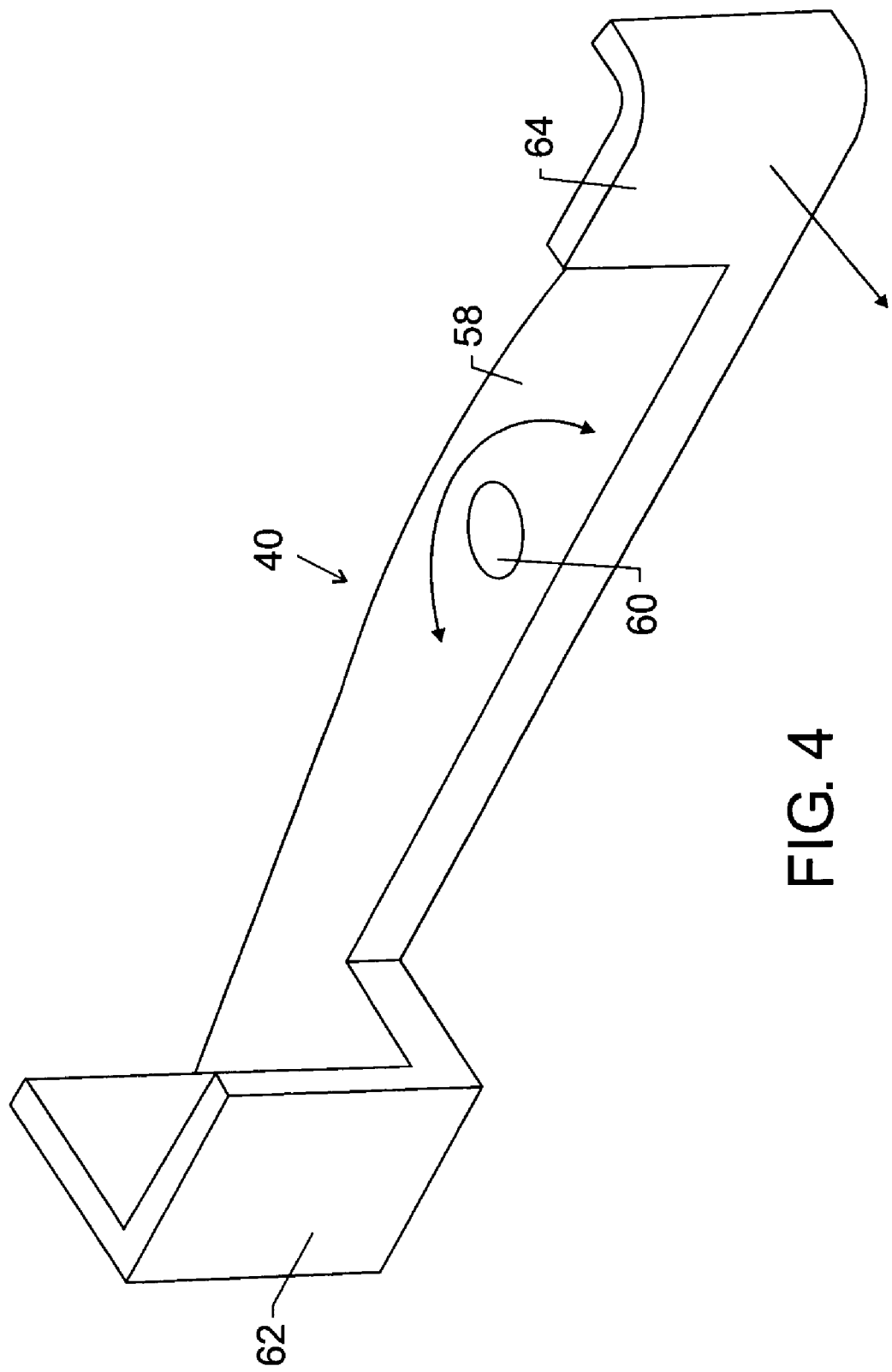
FIG. 4 is a perspective view of a lever portion of the system illustrated in FIG. 3.

As illustrated best in FIG. 4, an exemplary lever 40 comprises a pivot arm 58 having an opening 60 therethrough for receiving pivot 56. An abutment portion 62 is attached or formed at one end of pivot arm 58. Abutment portion 62 is designed to abuttingly engage base portion 42 when latch system 18 is actuated. At an end of pivot arm 58 generally opposite abutment portion 62, a press plate 64 is positioned to engage back 34 of component 14. Thus, as force is applied to abutment portion 62 by base portion 42, pivot arm 58 pivots about pivot 56 and drives press plate 64 against the back 34 of component 14. When sufficient force is applied, connector 26 is disconnected and component 14 is moved to its ejected position.

Figure 5:
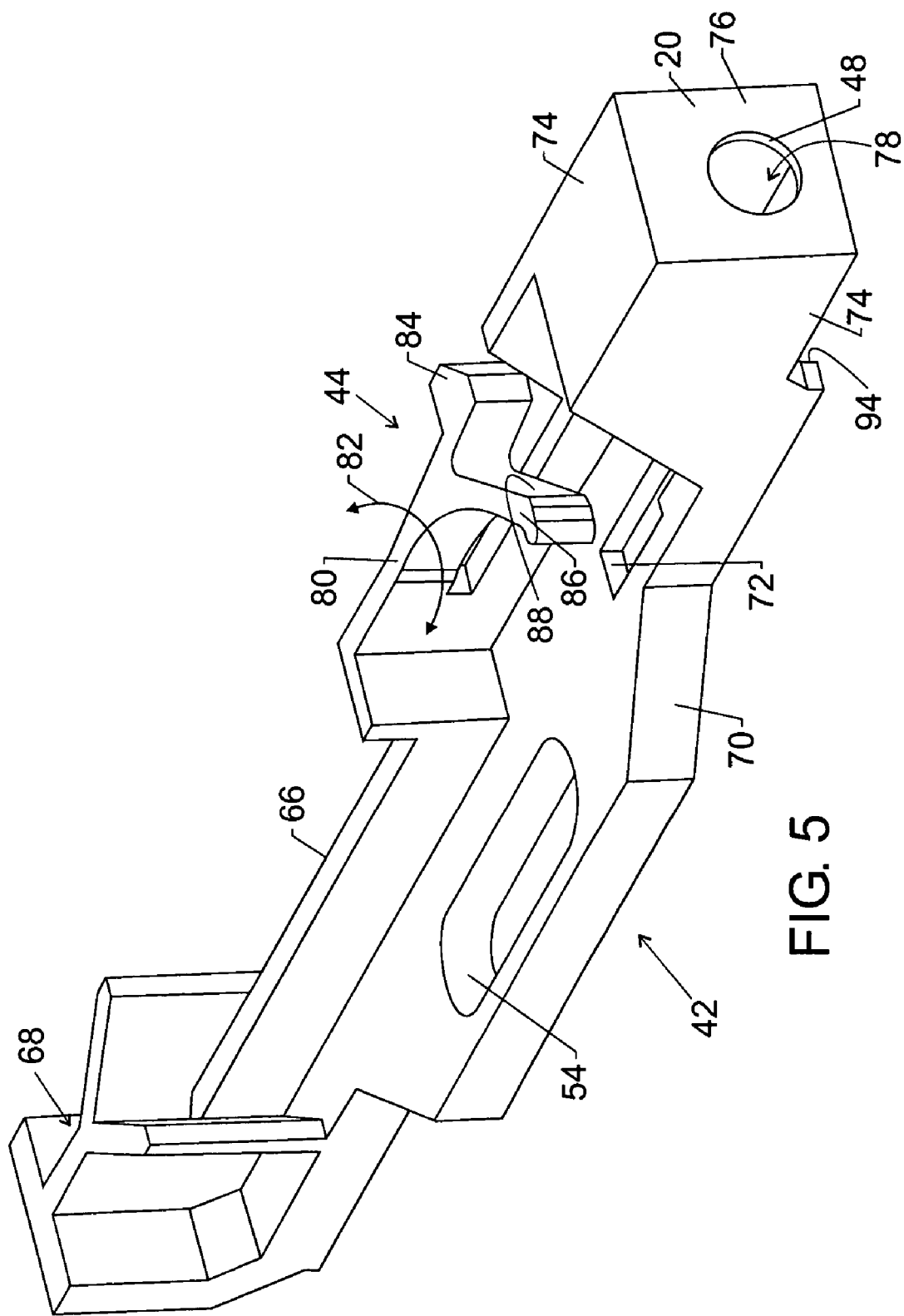
FIG. 5 is a perspective view of a latch and base portion of the system illustrated in FIG. 3.

Referring generally to FIG. 5, one exemplary embodiment of both base portion 42 and latch 44 is illustrated. Base portion 42 is designed generally as a plunger having a framework 66 extending between a press plate member 68 and push button 20. Framework 66 comprises a bottom plate 70 through which slot 54 is formed. Bottom plate 70 also comprises a slotted region 72 for slidably receiving release plunger 46.

Press plate member 68 is positioned to engage abutment portion 62 of lever 40 when push button 20 is pressed during actuation of latch system 18. Push button 20, on the other hand, is a generally hollow structure having a plurality of side walls 74 and a lead wall 76 through which opening 48 is formed. Push button 20 generally has a hollow interior 78 to receive release plunger 46.

Latch 44 is mounted to framework 66 by a spring member 80 to permit flexible motion of latch 44 as represented generally by arrow 82. Latch member 44 further comprises a catch 84 designed for insertion into recessed portion 38 of component 14. Spring member 80 biases catch 84 towards this engaged position. Thus, spring member 80 must be flexed against this bias to remove catch 84 when releasing and ejecting component 14.

To accomplish release of catch 84, latch 44 further comprises a spur 86 that extends across the sliding path of travel of release plunger 46. Spur 86 also is coupled to spring member 80 and disposed at an appropriate angle or arc such that movement of release plunger 46 against a slide surface 88 of spur 86 causes sufficient flex of spring member 80 to withdraw catch 84 from recessed portion 38. In the embodiment illustrated, spur 86 is positioned such that catch 84 is moved approximately twice the distance of the movement of release plunger 46 during release of component 14. However, the desired angle and/or arc of spur 86 and the resultant movement of catch 84 may vary from one application of latch system 18 to another.

Figure 6:
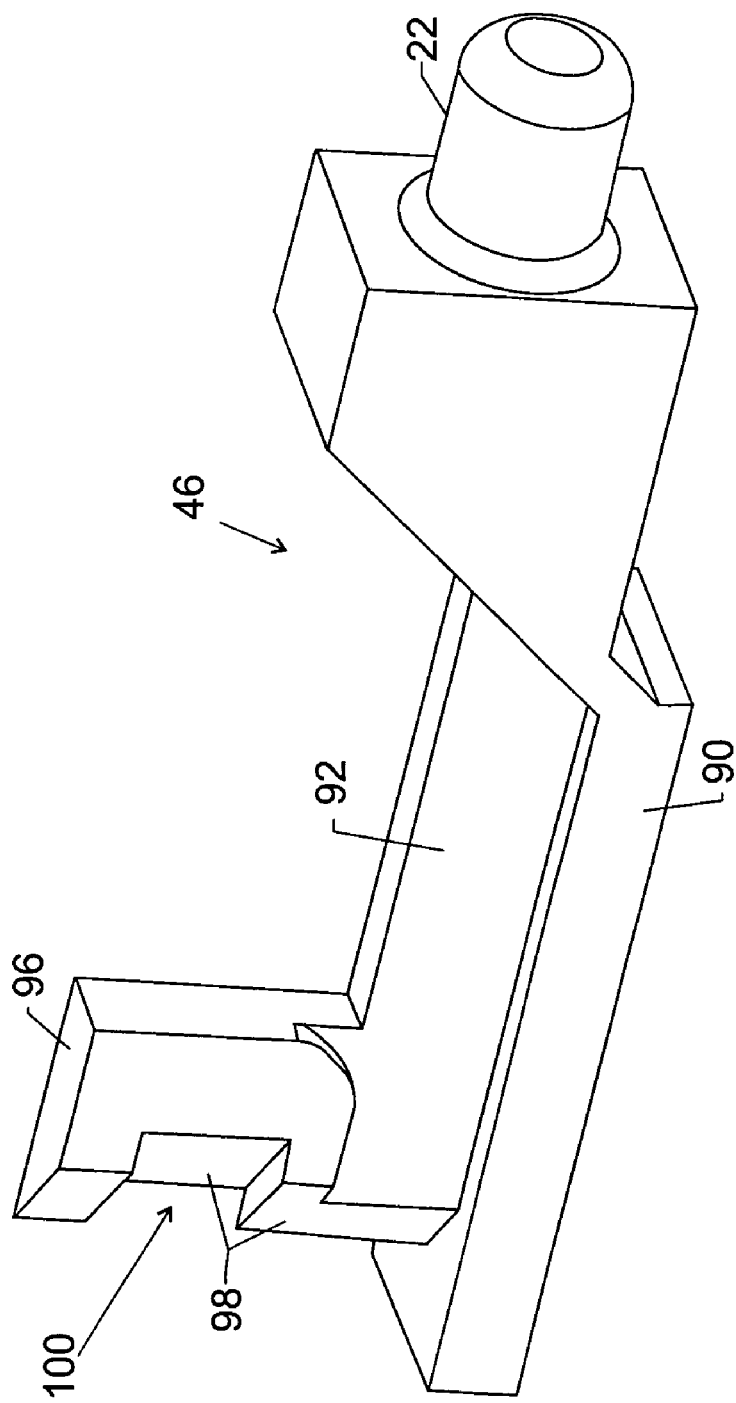
FIG. 6 is a perspective view of a plunger component utilized in the system illustrated in FIG. 3.

Referring generally to FIG. 6, one exemplary embodiment of release plunger 46 is illustrated. In this embodiment, push button 22 is mounted to a framework 90 that includes a slide member 92. Slide member 92 is sized and positioned to extend upwardly through slotted region 72 of base portion 42. Additionally, the width of framework 90 may be selected for sliding receipt in a lower groove 94 of base portion 42, as illustrated in FIG. 5.

An engagement plate 96 extends from slide member 92 such that the engagement plate also protrudes upwardly through slotted region 72 of base portion 42. Engagement plate 96 is positioned to engage slide surface 88 of spur 86 during actuation of latch 44 and release of catch 84. Engagement plate 96 may comprise an angled lead surface 98 angled to engage slide surface 88. Additionally, engagement plate 96 may include a notched region 100 sized to slidably receive spur 86 therein. Notched region 100 maintains spur 86 in a desired orientation during actuation.

The various components are combined to provide an easy, tool-less release and ejection of component 14. Actuation of both the release mechanism and the ejection mechanism only requires that a user provide a force and motion in one direction. However, it should be noted that other designs may deviate from this single motion depending on the particular design of electronic device 10 and tool-less latch system 18.

It will be understood that the foregoing description is of exemplary embodiments of this invention, and that the invention is not limited to the specific forms shown. For example, the latch system may be incorporated into a variety of electronic devices for the removal of different types of components; the latch system may be formed of various materials, including plastics and metals; and the size, shape, location and orientation of various features and components of the latch system may be changed for a given application. These and other modifications may be made in the design and arrangement of the elements without departing from the scope of the invention as expressed in the appended claims.

What is claimed is:

1. A latch mechanism for a removable component of an electronic device, comprising:
   a retention latch;
   a leveraging release member; and
   a multi-stage actuator comprising:
      a first actuator member having a generally linear path of travel to move the retention latch between engaged and disengaged positions with respect to the removable component; and
      a second actuator member having a generally linear path of travel to move the leveraging release member to eject the removable component;
      wherein the first actuator member is linearly movable independent of the second actuator member;
      and wherein the second actuator member is actuated by actuation of the first actuator member.

2. The latch mechanism of claim 1, wherein the retention latch comprises a catch member disposed adjacent a flexible member adapted to facilitate movement of the catch member between secured and released positions.

3. The latch mechanism of claim 1, wherein the first actuator member and the retention latch are wedgingly engageable along at least one angled surface.

4. The latch mechanism of claim 3, wherein the at least one angled surface is disposed on the retention latch.

5. The latch mechanism of claim 3, wherein the at least one angled surface is disposed on the first actuator member.

6. The latch mechanism of claim 1, wherein the leveraging release member comprises a pivot joint and an abutment surface offset from the pivot joint, wherein the second actuator member is movable against the abutment surface in the second position.

7. The latch mechanism of claim 1, wherein the first and second actuator members are configured to travel in the same general direction.

8. The latch mechanism of claim 1, wherein one of the first and second actuator members is disposed movably within the other of the first and second actuator members.

9. The latch mechanism of claim 1, wherein the first actuator member comprises a first button and the second actuator member comprises a second button.

10. The latch mechanism of claim 1, wherein the first actuator member comprises an externally accessible engagement portion adapted for user engagement outside the electronic device.

11. The latch mechanism of claim 10, wherein the second actuator member comprises another externally accessible engagement portion adapted for user engagement outside the electronic device.

12. A computer chassis, comprising:
a support structure having a receptacle adapted to receive a removable component;
a component retention latch adapted to latch the removable component removably within the receptacle;
a component release lever adapted to leverage the removable component out of the receptacle;
a first actuator movable in a first linear path adapted to unlatch the component retention latch from the removable component; and
a second actuator movable in a second linear path adapted to bias the lever against the removable component to eject the removable component with respect to the chassis;
wherein the first actuator is movable in the first linear path without movement of the second actuator; and
wherein the second actuator member is configured to be actuated to move the component release lever in response to actuation of the first actuator to effect said movement of the component retention latch.

13. The computer chassis of claim 12, wherein the support structure comprises a computer.

14. The computer chassis of claim 12, wherein the component retention latch comprises a catch member disposed against a flexible member adapted to bend and to position the catch member between secured and unsecured configurations with the removable component.

15. The computer chassis of claim 12, wherein the first actuator and the component retention latch are wedgingly engageable along an angled surface to bias the component retention latch.

16. The computer chassis of claim 12, wherein the component release lever comprises a pivot joint and an abutment surface offset from the pivot joint, wherein the second actuator is movable against the abutment surface during the second path.

17. The computer chassis of claim 12, wherein the first and second paths are substantially aligned with one another.

18. The computer chassis of claim 12, wherein one of the first and second actuators is disposed movably within the other of the first and second actuators.

19. The computer chassis of claim 12, wherein at least one of the first and second actuators comprises an externally accessible engagement portion extending outside the support structure.

20. The computer chassis of claim 19, wherein the externally accessible engagement portion comprises a button.

21. The computer chassis of claim 12, wherein actuation of the second actuator in the second linear path ejects the removable component with respect to the support structure.

22. A method of operating a mechanism for releasably mounting a drive within a computer chassis, comprising:
positioning a first actuator for release of a drive retention latch in a first position; and
disposing a second actuator for actuation to engage a drive release lever in a second position beyond the first position, wherein the second actuator engages the drive release lever after release of the drive retention latch and wherein the second actuator is configured to be actuated in response to actuation of the first actuator to release the drive retention latch.

23. The method of claim 22, comprising aligning the first and second actuators along a single path of motion.

24. The method of claim 22, comprising movably inserting one of the first and second actuators within the other of the first and second actuators.

25. The method of claim 22, comprising biasing a flexible member to move a catch member of the drive retention latch.

26. The method of claim 25, wherein biasing comprises orienting portions of the first actuator and the flexible member to interface wedgingly along an angled surface.

27. The method of claim 22, comprising orienting portions of the second actuator and the drive release lever to abut at an offset from a pivot joint of the drive release lever.

28. The method of claim 22, comprising orienting depressible portions of the first and second actuator members of an external location of the chassis.

29. A method of manufacturing a mechanism for releasably mounting a drive within a computer chassis, comprising:
providing a latch movable between released and secured positions with the drive;
providing a lever movable between unleveraged and leveraged positions against the drive;
providing a first actuator configured when actuated to engage with the latch to move the latch from the secured postion to the released position; and
providing a second actuator configured when actuated to engage with the lever after the latch has been moved to the released position to move the lever from the unleveraged position to the leveraged position;
and wherein the second actuator is configured to be actuated in response to actuation of the first actuator.

30. The method of claim 29, wherein providing the latch comprises forming the latch on a flexible member that is bendable between the released and secured positions.

31. The method of claim 30, comprising forming a wedging interface between the flexible member and the first actuator.

32. The method of claim 29, comprising forming an abutment interface between the lever and the second actuator.

33. The method of claim 29, comprising movably coupling one of the first and second actuators within a portion of the other of the first and second actuators.

34. The method of claim 29, comprising movably mounting the first and second actuators for engagement of both the first and second actuators with a single motion.

* * * * *